June 11, 1935.  J. CATARAU  2,004,308
ARTIFICIAL BAIT
Original Filed Sept. 10, 1934

Jules Catarau
INVENTOR

Patented June 11, 1935

2,004,308

UNITED STATES PATENT OFFICE 2,004,308

ARTIFICIAL BAIT

Jules Catarau, Seattle, Wash.

Original application September 10, 1934, Serial No. 743,403. Divided and this application February 12, 1935, Serial No. 6,212

1 Claim. (Cl. 43—46)

This invention relates to artificial bait known as plug, squid, jigger, etc., and resides in a novel construction on said baits of a scent oozing means so as to add to the optical allure effects on olfactory sense of fish sought. This application is a division of application Serial No. 743,403, filed Sept. 10, 1934.

The main object of the invention is to provide said scent oozing means on any lure-body of an artificial bait without marring the optical alluring effect of the same.

A further aim is to construct said means so that the same may be simple in operation and inexpensive to manufacture.

A still further aim is to construct said means suitable for heavy fishing and for fishing in waters obstructed by weeds and drift wood.

In the herewith annexed drawing the

Figure 1:
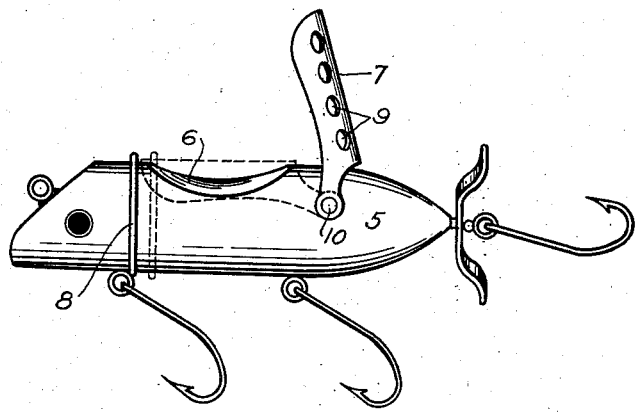
Figure 1 illustrates a lure-body provided with scent oozing means in accordance with this invention.

As plainly illustrated by the drawing any lure-body 5, having on its surface intermediate its ends a recessed portion 6, is provided with a plate-member 7, which is preferably hinged at 10 to the lure-body to fit over the recessed portion 6 and enclose scent material between its inner surface and the recessed portion 6 of the lure-body.

Figure 2:
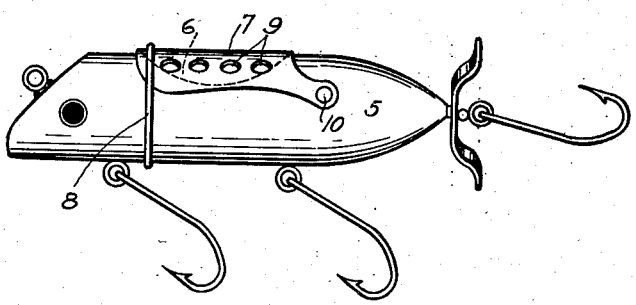
Figure 2 illustrates said scent oozing means opened so as to receive a load of scent material.
Figure 3:
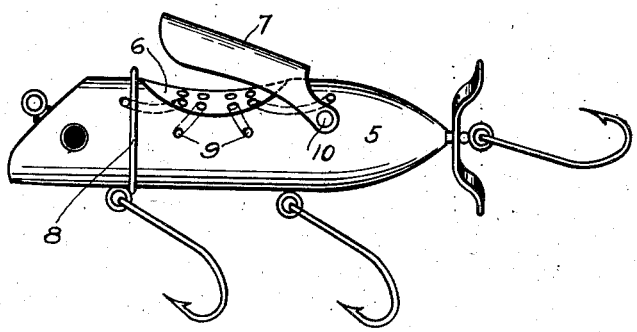
Figure 3 is a modified structure of said scent oozing means without departure from the spirit of the invention.

As means to hold said plate-member over the recessed portion a ring 8, or the like, is freely mounted on the lure-body to slide forth over the plate-member and retain the same close over the recessed portion as in Figure 2, and to slide back to release the hold over the plate-member and to permit access to the recessed portion for purpose of cleaning and reloading with fresh scent material, as illustrated in Figures 1 and 3.

A plurality of openings 9 are made through the wall of the plate-member to permit water to circulate in and out and to mix its molecules with emanations of the scent material and thereby create an effluvium around the artificial bait.

Said plurality of openings 9 may be dispensed with if the lure-body carries similar openings leading in and out, as in Figure 3, for the purposes stated hereinbefore.

The device is most simple of its kind, as the ring 8, plate-member 7, and the recessed surface 6 furnish a stout bait receptacle which is perfectly safe for heavy fishing and for fishing in waters obstructed by weeds and drift wood.

Furthermore, the device offers a quick access in the bait receptacle when a new scent material is required.

What I claim as my invention is:

A lure-body having on its surface intermediate its ends a recessed portion to receive scent material, a plate-member mounted on said lure-body to fit over the recessed portion and enclose the scent material, and a ring, or the like, freely mounted on the lure-body to slide over the plate-member and retain the same over the scent material.

JULES CATARAU.